(12) United States Patent
Tang et al.

(10) Patent No.: US 7,584,450 B2
(45) Date of Patent: Sep. 1, 2009

(54) METHOD AND APPARATUS FOR USING A DATABASE TO QUICKLY IDENTIFY AND CORRECT A MANUFACTURING PROBLEM AREA IN A LAYOUT

(75) Inventors: Zong Wu Tang, Pleasanton, CA (US); Daniel N. Zhang, San Jose, CA (US); Juhwan Kim, Pleasanton, CA (US); Hua Song, San Jose, CA (US); Weiping Fang, Fremont, CA (US); Lawrence S. Melvin, III, Hillsboro, OR (US)

(73) Assignee: Synopsys, Inc., Mountain View, CA (US)

( * ) Notice: Subject to any disclaimer, the term of this patent is extended or adjusted under 35 U.S.C. 154(b) by 288 days.

(21) Appl. No.: 11/637,424

(22) Filed: Dec. 12, 2006

(65) Prior Publication Data

US 2007/0198958 A1    Aug. 23, 2007

Related U.S. Application Data

(60) Provisional application No. 60/774,775, filed on Feb. 17, 2006.

(51) Int. Cl.
*G06F 17/50* (2006.01)

(52) U.S. Cl. .............. 716/19; 716/4; 716/5; 716/6; 716/20; 716/21; 703/13; 703/14

(58) Field of Classification Search ............. 716/4–6, 716/19–21; 713/13, 14
See application file for complete search history.

(56) References Cited

U.S. PATENT DOCUMENTS

| | | | |
|---|---|---|---|
| 6,584,609 B1 * | 6/2003 | Pierrat et al. ............. | 716/19 |
| 7,003,758 B2 * | 2/2006 | Ye et al. .................. | 716/21 |
| 7,107,571 B2 * | 9/2006 | Chang et al. ............. | 716/19 |
| 7,194,704 B2 * | 3/2007 | Kotani et al. ............. | 716/2 |
| 7,233,887 B2 * | 6/2007 | Smith ..................... | 703/2 |
| 2002/0035461 A1 * | 3/2002 | Chang et al. ............. | 703/13 |
| 2006/0085772 A1 * | 4/2006 | Zhang .................... | 716/4 |
| 2006/0236297 A1 * | 10/2006 | Melvin et al. ............ | 716/21 |
| 2006/0271906 A1 * | 11/2006 | Tang et al. .............. | 716/21 |
| 2007/0032896 A1 * | 2/2007 | Ye et al. .................. | 700/108 |
| 2007/0055953 A1 * | 3/2007 | Fang et al. ............... | 716/19 |
| 2007/0156379 A1 * | 7/2007 | Kulkarni et al. ........... | 703/14 |

* cited by examiner

*Primary Examiner*—Naum B Levin
(74) *Attorney, Agent, or Firm*—Park, Vaughan & Fleming LLP

(57) ABSTRACT

One embodiment provides a system for using a database to quickly identify a manufacturing problem area in a layout. During operation, the system receives a first check-figure which identifies a first area in a first layout, wherein the first area is associated with a first feature. Next, the system determines a first sample using the first check-figure, wherein the first sample represents the first layout's geometry within a first ambit of the first check-figure, wherein the first sample's geometry is expected to affect the shape of the first feature. The system then performs a model-based simulation using the first sample to obtain a first simulation-result which indicates whether the first feature is expected to have manufacturing problems. Next, the system stores the first simulation-result in a database which is used to quickly determine whether a second feature is expected to have manufacturing problems.

14 Claims, 5 Drawing Sheets

LAYOUT PORTION
500

SAMPLE
602

CORRECTED
SAMPLE
604

METHOD AND APPARATUS FOR USING A DATABASE TO QUICKLY IDENTIFY AND CORRECT A MANUFACTURING PROBLEM AREA IN A LAYOUT

RELATED APPLICATION

This application hereby claims priority under 35 U.S.C. §119 to U.S. Provisional Patent Application No. 60/774,775, filed on 17 Feb. 2006, entitled "Use of process models to enhance device performance through semiconductor design," the contents of which are herein incorporated by reference.

BACKGROUND

1. Field of the Invention

The present invention relates to integrated circuit design and manufacturing. More specifically, the present invention relates to a method and an apparatus for using a database to quickly identify and correct a manufacturing problem area in a layout.

2. Related Art

Semiconductor manufacturing technologies typically include a number of processes which involve complex physical and chemical interactions. These processes typically have process variations that can cause the characteristics of the integrated circuit to be different from the desired characteristics. If this difference is too large, it can lead to manufacturing problems which can reduce the yield and/or reduce the performance of the integrated circuit.

Today, the semiconductor manufacturing industry is facing a serious problem: the intersection between the patterns that a design desires to produce and the capabilities of the manufacturing process is growing increasingly miniscule. Many new process capabilities are being developed, but they are not enough to produce the full range of desired patterns. A promising solution to this problem is to identify the working overlap region at design time and to keep all patterns within the overlap region. Unfortunately, prior art techniques cannot quickly and accurately identify the working overlap region at design time.

An important goal in semiconductor design and manufacturing is to allow as much design freedom for the design team as possible, while still producing a manufacturable layout, all in a rapid turn around time. Failure to allow design freedom can result in increased die size or reduced device performance. Conversely, allowing unlimited design freedom can result in reduced yield or even total device failure. Unfortunately, prior art techniques cannot quickly and accurately identify states that can lead to manufacturing problems. If these states are padded, device performance and die size are impacted. If these states are loosened, the wafer yield is jeopardized.

Prior art techniques usually determine the transition from a manufacturing limiting pattern to a manufacturing capable pattern using rule-based approaches which typically capture relationships between neighboring polygons. However, as relationships between nonadjacent polygons become important, as found in illumination systems employing off-axis illumination for example, prior art techniques become deficient in their ability to accurately identify manufacturing problems.

Hence, what is needed is a method and an apparatus to improve the manufacturability of a layout by quickly identifying and correcting manufacturing problems.

SUMMARY

Prior art techniques, such as Boolean based DRC (design rule check) techniques, usually do not identify manufacturing problems that are caused by interactions between the polygon of interest and polygons that are located beyond the neighboring polygons.

One embodiment of the present invention uses a model-based approach to determine manufacturing problem areas by capturing the effects of polygons that are located beyond the neighboring polygons. In contrast to prior art techniques, the embodiment uses the model-based approach to create a pattern matching database to speed up pattern analysis. The database can then be used in many different applications. For example, the system can use the database to enable a design team to identify and correct manufacturing problems during the design process. Alternatively, the system can use the database during the routing step to increase pattern manufacturability. Additionally, the system can use the database during parasitic extraction to understand the effects of the processes on the device functionality.

During operation, the system can receive a check-figure which identifies an area in a layout which is associated with a problematic feature. The layout can be a mask layout or it can be a design intent layout. Next, the system can determine a sample using the check-figure, wherein the sample is a portion of the layout within an ambit of the check-figure. The system can then perform a model-based simulation using the sample to obtain a simulation result which indicates whether the problematic feature is expected to have manufacturing problems. Next, the system can store the simulation result in a database which can then be used to quickly identify manufacturing problem areas in a layout.

In an embodiment, the system can receive a database which associates layout samples with simulation results and/or proximity corrections. Next, the system can receive a check-figure which identifies an area in a layout which may have manufacturing problems. Note that the layout can be a mask layout or it can be a design intent layout. The system can then determine a problematic sample using the check-figure, wherein the problematic sample is a portion of the layout within an ambit of the check-figure. Next, the system can use a pattern matching technique to identify samples in the database whose geometry is substantially similar to the problematic sample's geometry. The system can then use the simulation results associated with these samples to determine whether the problematic sample is expected to have manufacturing problems.

DETAILED DESCRIPTION

Integrated Circuit Design Flow

Figure 1:
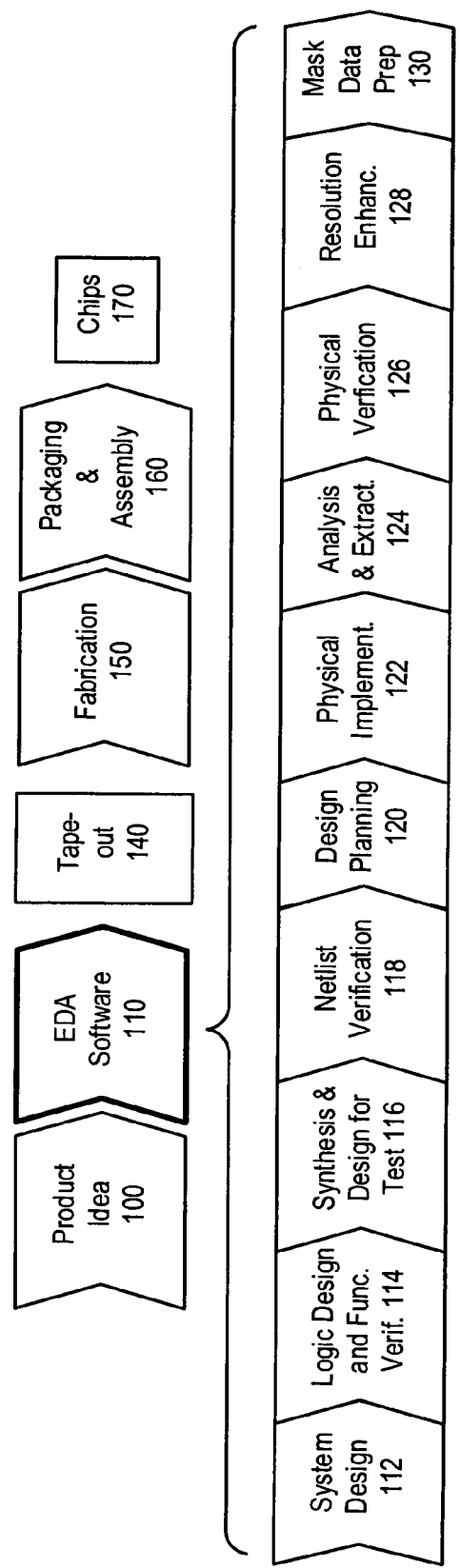
FIG. 1 illustrates various steps in the design and fabrication of an integrated circuit in accordance with an embodiment of the present invention.

FIG. 1 illustrates various steps in the design and fabrication of an integrated circuit in accordance with an embodiment of the present invention.

The process starts with the conception of the product idea (step 100) which is realized using an EDA software design process (step 110). When the design is finalized, it can be taped-out (event 140). After tape out, the fabrication process (step 150) and packaging and assembly processes (step 160) are performed which ultimately result in finished chips (result 170).

The EDA software design process (step 110), in turn, comprises steps 112-130, which are described below. Note that the design flow description is for illustration purposes only. This description is not meant to limit the present invention. For example, an actual integrated circuit design may require the designer to perform the design steps in a different sequence than the sequence described below. The following discussion provides further details of the steps in the design process.

System design (step 112): In this step, the designers describe the functionality that they want to implement. They can also perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, tests can be designed and implemented to check the finished chips. Exemplary EDA software products from Synopsys, Inc. that can be used at this step include Design Compiler®, Physical Compiler, Test Compiler, Power Compiler, FPGA Compiler, Tetramax, and DesignWare® products.

Netlist verification (step 118): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 120): Here, an overall floorplan for the chip is constructed and analyzed for timing and top-level routing. Exemplary EDA software products from Synopsys, Inc. that can be used at this step include Astro and IC Compiler products.

Physical implementation (step 122): The placement (positioning of circuit elements) and routing (connection of the same) occurs at this step. Exemplary EDA software products from Synopsys, Inc. that can be used at this step include the Astro and IC Compiler products.

Analysis and extraction (step 124): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 126): In this step, the design is checked to ensure correctness for manufacturing, electrical issues, lithographic issues, and circuitry. Exemplary EDA software products from Synopsys, Inc. that can be used at this step include the Hercules product.

Resolution enhancement (step 128): This step involves geometric manipulations of the layout to improve manufacturability of the design. Exemplary EDA software products from Synopsys, Inc. that can be used at this step include Proteus, ProteusAF, and PSMGen products.

Mask data preparation (step 130): This step provides the "tape-out" data for production of masks to produce finished chips. Exemplary EDA software products from Synopsys, Inc. that can be used at this step include the CATS(R) family of products.

Embodiments of the present invention can be used during one or more of the above-described steps. Specifically, one embodiment of the present invention can be used during the physical verification step 124 and/or the resolution enhancement step 128.

Rule-Based Approaches

Figure 2:
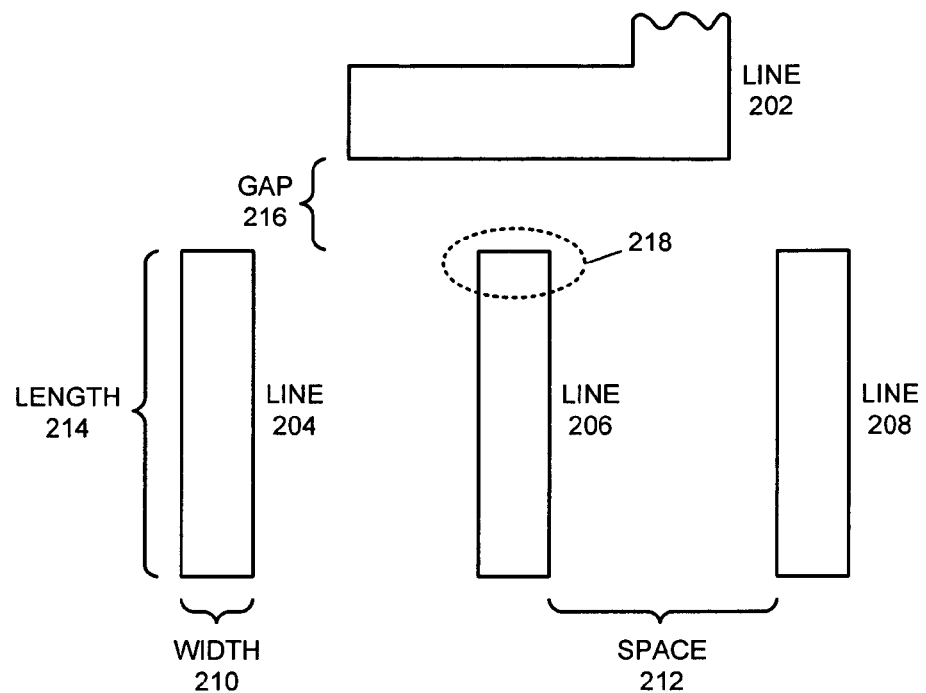
FIG. 2 illustrates how a problem area can be identified using a rule-based approach in accordance with an embodiment of the present invention.

FIG. 2 illustrates how a problem area can be identified using a rule-based approach in accordance with an embodiment of the present invention.

Lines 202, 204, 206, and 208 are part of a layout. In a rule-based approach, problem areas are identified using a set of rules which use a variety of parameters. Assume that, due to its neighboring geometry, line-end 218 has a manufacturing problem. In a rule-based approach, line-end 218 can be identified as a problem area using a rule that uses parameters associated with line-end 218, such as, width 210, space 212, length 214, and gap 216.

To improve the manufacturability of integrated circuits, designers typically use rule-based approaches that specify constraints for the sizes and shapes of patterns in the layout. However, as semiconductor manufacturing nodes march towards increasingly aggressive process nodes, rule-based approaches are becoming very complex and unmanageable. Moreover, at deep submicron dimensions, rule-based approaches can be overly restrictive, thereby preventing designers from being able to achieve the best device performance.

Limitations of Rule-Based Approaches

Figure 3:
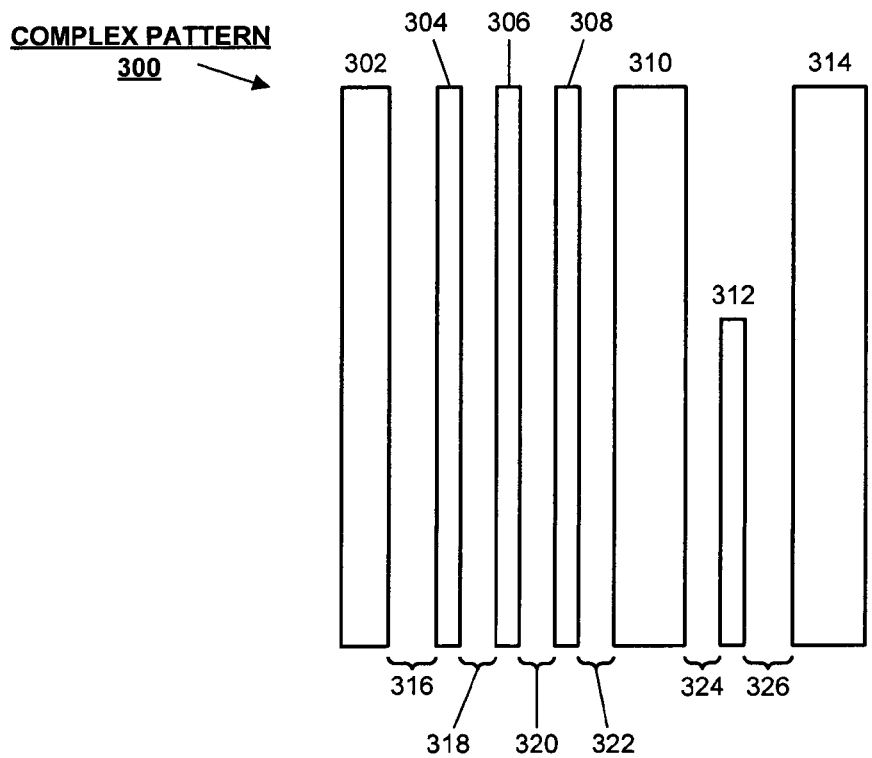
FIG. 3 illustrates a complex pattern in a layout in accordance with an embodiment of the present invention.

FIG. 3 illustrates a complex pattern in a layout in accordance with an embodiment of the present invention.

Complex pattern 300 comprises lines 304, 306, 308, 312, and large polygons 302, 310, and 314. The lines and polygons are separated from one another by spaces 316, 318, 320, 322, 324, and 326. Note that lines 304, 306, and 308 are in a nested configuration, bordered by large polygons 302 and 310. If complex pattern 300 is fabricated using a damascene metal process, the polygons image as trenches and the spaces image as photoresist.

Rule-based approaches usually cannot accurately predict whether a complex pattern will image properly. Complex pattern 300's geometry suggests that there is sufficient contrast to image lines 304, 306, and 308. Hence, a rule-based approach would most probably indicate that the complex pattern 300 will not have any manufacturing problems. However, upon fabrication, lines 304 and 306 may image properly, but line 308 may not image properly because it may be sensitive to exposure variations during wafer fabrication. Similarly, a rule-based approach would most likely indicate that line 312 would image properly. However, line 312 may have manufacturing problems during fabrication due to its proximity to large polygons 310 and 314.

Rule-based approaches are designed to check interactions between polygons and their immediate neighbors. However, at deep submicron dimensions, the image is affected not only by immediately neighboring polygons, but also polygons which are located beyond the immediately neighboring polygons. For example, line 308 has imaging problems because of its proximity to large polygons 302 and 310, and the specific dimensions of spaces 316 and 324. Note that polygon 302 and spaces 316 and 324 are not immediate neighbors of line 308. It will be apparent that using rule-based approaches to capture the effect of such complex geometrical relationships can be very difficult. For these reasons, at deep submicron dimensions, rule-based approaches usually cannot accurately identify manufacturing problem areas.

Identifying a Manufacturing Problem Area using a Process Model

One embodiment of the present invention uses a process model to analyze a portion of a layout for manufacturing robustness, thereby allowing the design team to make informed layout revisions. The process model can capture effects due to many manufacturing processes including exposure, registration, etch, reticle construction, electro migration, etc. The process model approach can be used in addition to a rule-based approach. Specifically, a process model approach may be used for complex pattern configurations.

There are at least three challenges in developing a feature identification scheme to identify a manufacturing problem. The first challenge is to identify problem features. The second challenge is to determine whether a given sample is similar to a problem sample. The third challenge is to determine whether a solution will help, harm, or be indifferent to the manufacturing robustness of the area of interest.

The first challenge deals with generating a pattern recognition database. To generate a pattern recognition database that contains problem samples, the manufacturing problem and its cause must be identified. If the problem is identified using a process model of the pattern, the problem identification is relatively inexpensive, and it costs mostly computation and analysis time. However, some manufacturing problems may not be found until the wafer is fabricated. In those cases, the identification of the problem sample can become significantly more expensive.

The second challenge involves pattern matching between a given sample and a problem sample. When a feature has manufacturing problems, the exact problem configuration can be stored in a database. However, similar configurations, such as widening a line by 10 nm or moving a line 10 nm with respect to the problem feature, may still fail. If an exact pattern matching technique is used, either these similar patterns will be missed or a large database of problem samples must be generated and analyzed. Another approach is to use "fuzzy" pattern matching, where patterns similar to the problem configuration are identified. This technique can identify patterns that are likely to have manufacturing problems without using a large database. However, such approximate pattern matching techniques may limit the design team by incorrectly flagging good patterns.

The third challenge is to determine how to repair the manufacturing problem. In prior art techniques, the design team usually had to use a process model simulation to determine fixes. However, one embodiment of the present invention stores proximity corrections in the database which can be applied to a sample to fix the manufacturing problem.

Using a Database to Quickly Identify Manufacturing Problem Areas

Figure 4:
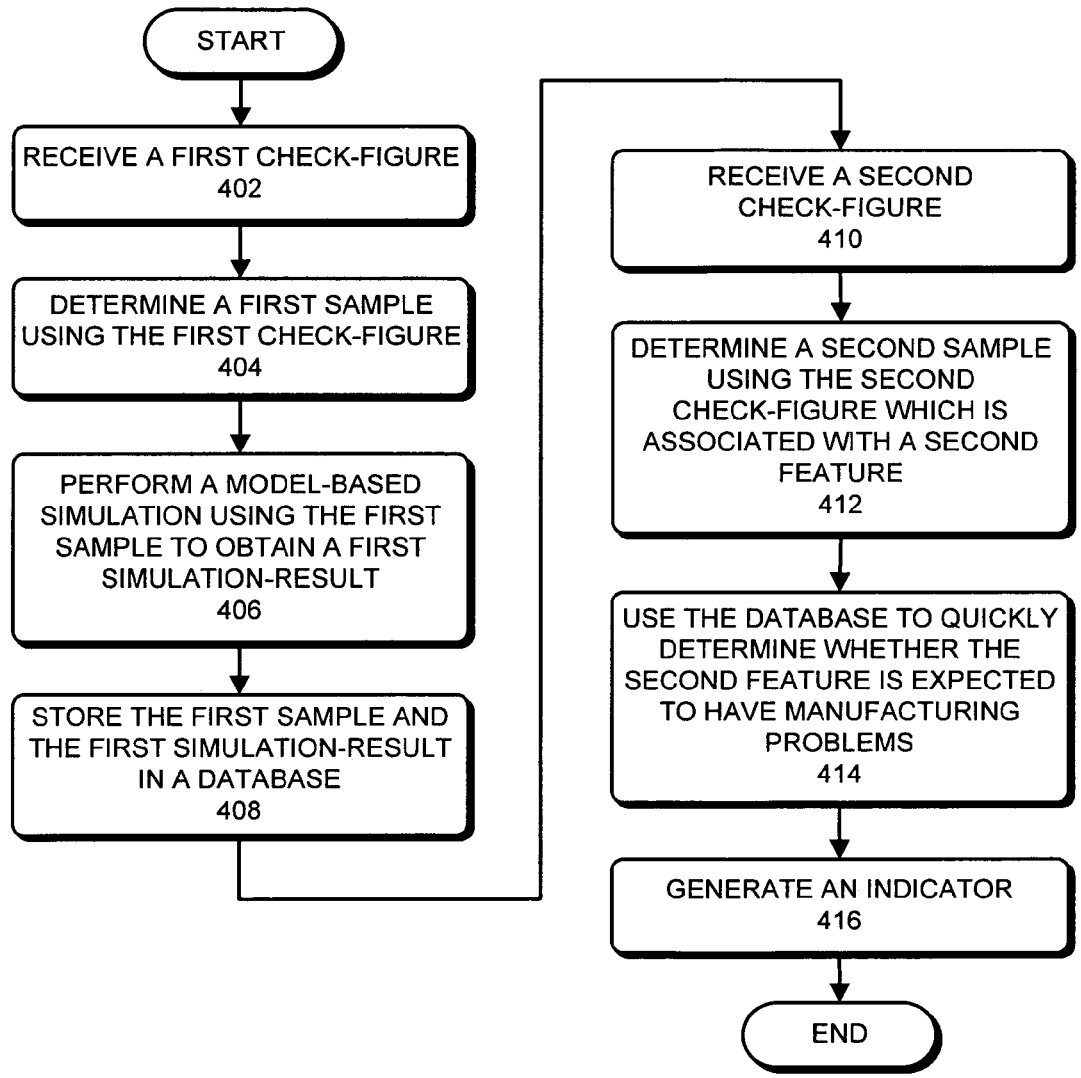
FIG. 4 presents a flowchart that illustrates a process for using a database to quickly identify a manufacturing problem area in a layout in accordance with an embodiment of the present invention.

FIG. 4 presents a flowchart that illustrates a process for using a database to quickly identify a manufacturing problem area in a layout in accordance with an embodiment of the present invention.

The process usually begins by receiving a first check-figure which identifies a first area in a first layout, wherein the first area is associated with a first feature (step 402). The first layout can be a mask layout or it can be a design intent layout.

The system can generate a check-figure by first identifying a polygon's edge which is susceptible to manufacturing problems. Next, the system can generate a check-figure which identifies the polygon's edge.

In one embodiment, the system classifies the geometrical patterns in the layout into pattern types such as, line-end, inner-corner, outer-corners and gate-endcap, etc. The system can then use different tolerances for these different pattern types. Specifically, the system can generate a check-figure based on the tolerance that is associated with the pattern type. Further, the system can use the pattern type to determine how to correct the manufacturing problem. Advanced resolution enhancement techniques sometimes use asymmetric process models which model anisotropic manufacturing processes. Hence, in one embodiment, the system determines a pattern orientation which can be used to determine a tolerance and/or to determine how to correct the manufacturing pattern. The system may store different orientations of the same sample as separate entries in the database. Alternatively, the database may contain a single entry for each sample, regardless of the orientation.

Continuing with the description of FIG. 4, the system can determine a first sample using the first check-figure (step 404). The first sample represents the first layout's geometry within a first ambit of the first check-figure. The first sample's geometry is expected to affect the shape of the first feature.

Prior art techniques usually define the local region such that it comprises the polygons immediately next to the polygon of interest. However, this definition is incomplete because it ignores the effects of polygons that are not immediate neighbors of the polygon of interest. One embodiment of the present invention expands the local region to encompass the process ambit which is the area of influence of the manufacturing process. The ambit can include polygons that are not immediate neighbors of the polygon of interest.

Figure 5:
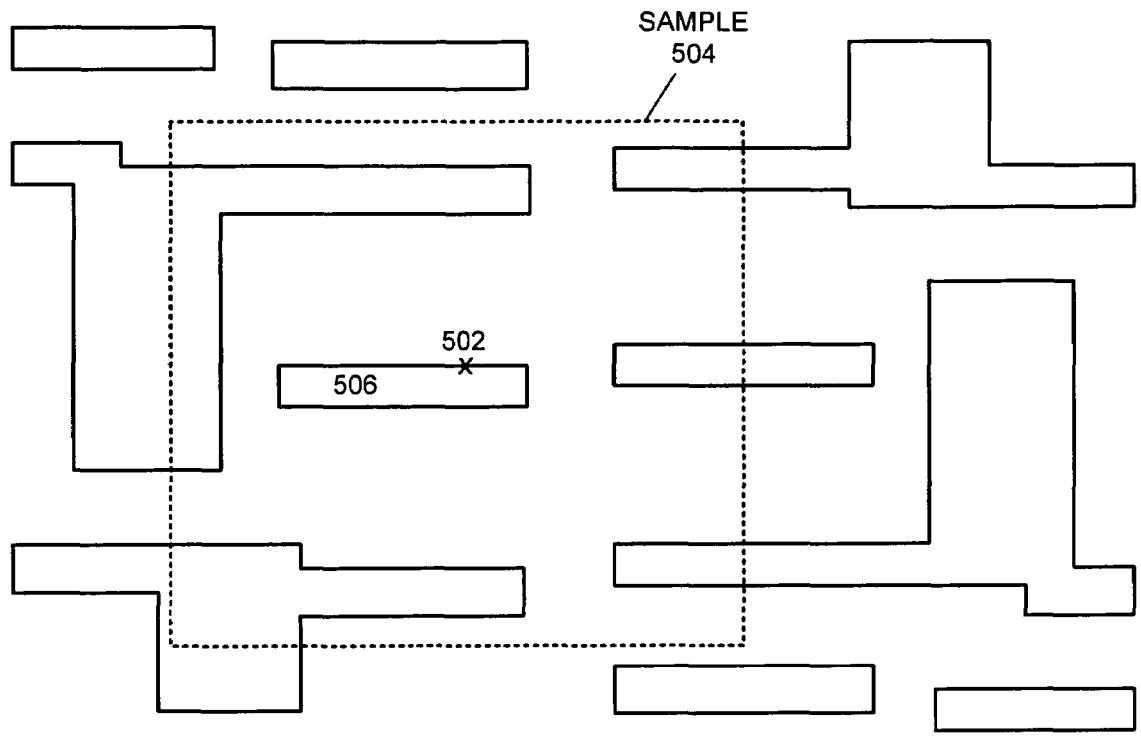
FIG. 5 illustrates how a system can determine a sample using a check-figure in accordance with an embodiment of the present invention.

FIG. 5 illustrates how a system can determine a sample using a check-figure in accordance with an embodiment of the present invention.

Layout portion 500 comprises a number of polygons. The system can determine that polygon 506's edge is susceptible to manufacturing problems. Accordingly, the system can generate check-figure 502 that identifies polygon 506's edge. The system can then determine sample 504 within an ambit of check-figure 502.

The system can then perform a model-based simulation using the first sample to obtain a first simulation-result which indicates whether the first feature is expected to have manufacturing problems (step 406).

The system can perform the model-based simulation by convolving a process model with the first sample. The first simulation-result can include a Boolean indicator that indicates whether the first feature is expected to have manufacturing problems. The first simulation-result can also include other parameters such as, contrast, NILS (normalized image log slope), depth-of-focus, etc.

Next, the system can store the first simulation-result in a database (step 408).

In one embodiment, the system can generate a first identifier using the first sample's geometry. Next, the system can store the first identifier and the first simulation-result in the database such that the first simulation-result can be queried using the first identifier. Further, in one embodiment, if the first feature is expected to have manufacturing problems, the system can determine a first proximity-correction using the first sample. The system can then store the first proximity-correction in the database such that the first proximity-correction can be queried using the first identifier. In one embodiment, the first identifier can be a hash value that is determined using the coordinates of the polygons in the first sample.

In another embodiment, the system may store the first identifier in the database only if the first simulation-result indicates that the first feature is expected to have manufacturing problems. In this embodiment, if the system determines that the first feature is not expected to have manufacturing problems, the system may not store the first simulation-result. In one embodiment, the database may contain only those identifiers that are associated with samples which have manufacturing problems.

Figure 6:
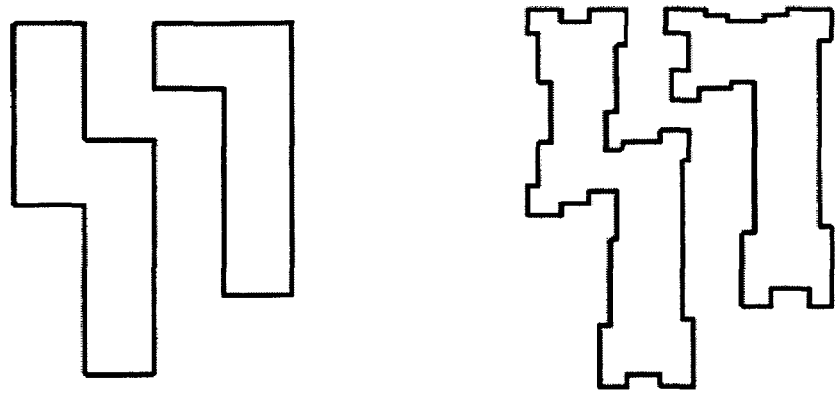
FIG. 6 illustrates a proximity correction in accordance with an embodiment of the present invention.

FIG. 6 illustrates a proximity correction in accordance with an embodiment of the present invention.

Sample 602 may be associated with a feature that is expected to have manufacturing problems. The system can apply a proximity-correction to sample 602 to fix its manufacturing problems. For example, when a proximity correction is applied to sample 602, it may result in corrected sample 604. In one embodiment, the system can query the database to determine a proximity correction that is associated with a sample. Next, the system can apply the proximity correction to the sample to fix the manufacturing problem.

Figure 7:
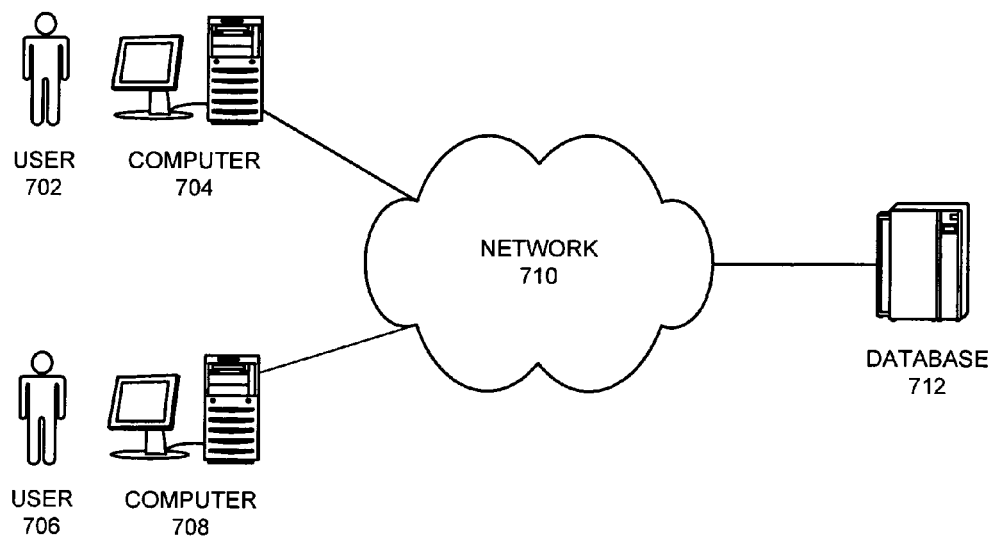
FIG. 7 illustrates a database that can be used to quickly identify a manufacturing problem area in a layout in accordance with an embodiment of the present invention.

FIG. 7 illustrates a database that can be used to quickly identify a manufacturing problem area in a layout in accordance with an embodiment of the present invention.

Computers 704 and 708, and database 712 can communicate with one another using network 710. Network 710 can generally include any type of wire or wireless communication channel capable of coupling together computing nodes. This includes, but is not limited to, a bus, a switch, a local area network, a wide area network, or a combination of networks. In one embodiment of the present invention, network 710 can include the Internet.

Database 712 can store data using a variety of data storage systems. This includes, but is not limited to, systems based upon magnetic, optical, and magneto-optical storage devices, as well as storage devices based on flash memory and/or battery-backed up memory.

A computer, such as computers 704 or 708, can generally include any type of communication device capable of communicating with other network nodes via a network. This includes, but is not limited to, a computer system based on a microprocessor, a mainframe computer, a server, or other computing system capable of processing data.

In one embodiment, user 702 can use computer 704 to perform model-based simulations on a number of samples. The simulation results can indicate whether the features that are associated with the samples are expected to have manufacturing problems. User 702 can then store the samples (or the sample-identifiers) and the simulation results in database 712. Next, user 706 can use database 712 to quickly identify manufacturing problems in a layout. Specifically, during circuit design, user 706 can determine a first sample which is associated with a first feature that is expected to have manufacturing problems. Next, user 706 can use computer 708 to query database 712 to determine samples which are substantially similar to the first sample. Next, the system can use the samples retrieved from database 712 to determine whether the first sample is expected to have manufacturing problems.

The foregoing description is not intended to be exhaustive or to limit the present invention to the forms disclosed. Accordingly, many modifications and variations will be readily apparent to practitioners skilled in the art. For example, the database can be stored in a file on a computer, such as computers 704 and 708. User 706 can use the file to identify manufacturing problems in a layout. In another embodiment, the system can use two or more databases to quickly identify manufacturing problems in a layout. Specifically, the system can use a run-time database and an external database. The external database can be a database that is generated using samples that are extracted from layouts that are different from the layout of interest. The run-time database can be a database that is generated using samples from the layout of interest. Initially, the run-time database can be empty. The system can use the external database to determine whether a feature that is associated with a sample in the layout of interest is expected to have manufacturing problems. Next, the system can store this sample in the run-time database which can be used to determine the manufacturability of subsequent samples. Using a run-time database in addition to an external database can further speed up the process for determining manufacturing problem areas in the layout of interest.

Continuing with the description of FIG. 4, the system can receive a second check-figure which identifies a second area in a second layout (step 410). The second layout can be a mask layout or it can be a design intent layout.

Next, the system can determine a second sample using the second check-figure (step 412). The second sample represents the second layout's geometry within a second ambit of the second check-figure, wherein the second sample's geometry is expected to affect the shape of the second feature.

The size and/or shape of the ambit can be different for different applications. For example, the system can use a large ambit to determine a proximity correction, whereas the system may use a small ambit to determine a manufacturing problem area.

The system can then use the database to quickly determine whether the second feature is expected to have manufacturing problems (step 414).

In one embodiment, the system can query the database using the second sample to determine a third simulation-result which is associated with a third sample, wherein the third sample's geometry is substantially similar to the second sample's geometry. Specifically, in one embodiment, the system can generate a second identifier using the second sample's geometry. Next, the system can query the database using the second identifier to determine the third simulation-result. Next, the system can use the third simulation-result to determine whether the second feature is expected to have manufacturing problems.

In one embodiment, the system can use a pattern matching technique to determine whether a third sample is substantially similar to the second sample. Specifically, the system can perform an exclusive-or operation between the second sample and the third sample. If the two patterns are different, polygons will be left in the footprint area of the second sample. If the polygons in the third sample pattern are substantially similar to the polygons in the second sample, no polygons will be left after the exclusive-or operation. The above pattern matching technique was described for illustration purposes, and is not intended to limit the present invention. For example, the system can perform pattern matching by generating a hash value using the coordinates of the polygons in the second sample. Specifically, the hash function may be chosen so that, if two samples have substantially similar geometries, the associated hash values will be the same. Next, the system can query the database using the hash value to determine whether the second sample is expected to have manufacturing problems.

One embodiment of the present invention can substantially reduce the turn-around time by taking advantage of the repetitious nature of integrated circuit layout such as SRAM (static random access memory) designs.

The system can then generate an indicator which indicates whether the second feature is expected to have manufacturing problems (step 416).

If the second feature is expected to have manufacturing problems, the system can query the database using the second sample to determine a third proximity-correction which is associated with a third sample, wherein the third sample's geometry is substantially similar to the second sample's geometry. Specifically, in one embodiment, the system can generate a second identifier using the second sample's geometry. Next, the system can query the database using the second identifier to determine the third proximity-correction. The system can then determine the second proximity-correction using the third proximity-correction. Next, the system can apply the second proximity-correction to the second sample.

The system can use different pattern matching techniques for different applications. Specifically, the system can use an approximate pattern matching technique to determine manufacturing problem areas, and the system may use a less approximate (e.g., exact) pattern matching technique to determine proximity correction. In one embodiment, the system can perform approximate pattern matching by reducing the resolution or defocusing the sample image before querying the database.

The system can store the manufacturing problem areas in a database (e.g. an error database) and can categorize the manufacturing problems based on a number of parameters, such as, the pattern type, orientation, severity of the manufacturing problem, etc. Note that the system can group similar manufacturing problem areas into a single category because of its pattern matching capability. During error analysis, users can query the database to sort out and browse through the problem areas based on user-defined criteria. Since the system can group similar manufacturing problem areas, it can substantially reduce the amount of time users spend analyzing and correcting the manufacturing problem areas.

Embodiments of the present invention provide several advantages over the prior art. First, embodiments of the present invention use model-based simulation to directly identify lithographic hotspots. This is in contrast to prior art techniques which typically use a difficult and costly method to search for process interactions between polygons and their neighbors. Second, embodiments of the present invention can populate a database with known problematic configurations. The database can then be used to identify and correct manufacturing problem areas. The database can substantially reduce the amount of computation when the number of polygons is very large, e.g., during a full-chip IC (integrated circuit) design. Third, the run-time accessible model and the embodiment's polygon-manipulation capabilities enable users to investigate possible fixes to the hotspots by geometrically manipulating the problematic configuration.

CONCLUSION

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent to practitioners skilled in the art. Additionally, the above disclosure is not intended to limit the present invention. The scope of the present invention is defined by the appended claims.

What is claimed is:

1. A method for using a database to quickly identify a manufacturing problem area in a layout, the method comprising:
using at least one computer to:
determining a first sample in proximity to a first location in a first layout, wherein the first sample represents the first layout's geometry within an ambit of the first location, wherein the first sample's geometry is expected to affect the shape of a first feature;
performing a model-based simulation using the first sample to obtain a first simulation-result which indicates whether the first feature is expected to have manufacturing problems;
storing the first simulation-result in a database;
determining a second sample in proximity to a second location in a second layout, wherein the second location is different from the first location, wherein the second sample represents the second layout's geometry within an ambit of the second location, and wherein the second sample's geometry is expected to affect the shape of a second feature;
querying the database to determine if the second sample's geometry is substantially similar to the first sample's geometry; and
in response to determining that that second sample's geometry is substantially similar to the first sample's geometry, using the first simulation-result to generate an indicator which indicates whether the second feature is expected to have manufacturing problems.

2. The method of claim 1, wherein performing the model-based simulation involves convolving a process model with the first sample.

3. The method of claim 1, wherein prior to determining the first sample, the method comprises:
identifying a polygon's edge which is susceptible to manufacturing problems; and
selecting a location on the polygon's edge to be the first location.

4. The method of claim 1, wherein storing the first simulation-result involves:
generating a first identifier using the first sample's geometry; and
storing the first identifier and the first simulation-result in the database so that the first simulation-result can be queried using the first identifier.

5. The method of claim 4, further comprising:
determining a first proximity-correction using the first sample in response to determining that the first feature is expected to have manufacturing problems; and
storing the first proximity-correction in the database so that the first proximity-correction can be queried using the first identifier.

6. The method of claim 5, further comprising using the database to apply the first proximity-correction to the second sample by:
generating a second identifier using the second sample's geometry;
querying the database using the second identifier to determine whether the first sample's geometry is substantially similar to the second sample's geometry; and
in response to determining that the first sample's geometry is substantially similar to the second sample's geometry, applying the first proximity-correction to the second sample.

7. A method for using a database to quickly perform proximity correction on a layout, the method comprising:

using at least one computer to:
associating via the database a first sample in proximity to a first location in a first layout with a first proximity-correction, and wherein the first sample represents a portion of the first layout which is expected to cause manufacturing problems with a first feature;
determining a second sample in proximity to a second location in a second layout, wherein the second location is different from the first location, wherein the second sample represents the second layout's geometry within an ambit of the second location, wherein the second sample's geometry is expected to affect the shape of a second feature; and
using the database to quickly perform proximity correction on the second sample by:
querying the database using the second sample to determine whether the second sample's geometry is substantially similar to the first sample's geometry; and
in response to determining that the second sample's geometry is substantially similar to the first sample's geometry, applying the first proximity correction to the second sample.

8. A computer-readable storage device storing instructions that when executed by a computer cause the computer to perform a method for using a database to quickly identify a manufacturing problem area in a layout, the method comprising:
determining a first sample in proximity to a first location in a first layout, wherein the first sample represents the first layout's geometry within an ambit of the first location, wherein the first sample's geometry is expected to affect the shape of a first feature;
performing a model-based simulation using the first sample to obtain a first simulation-result which indicates whether the first feature is expected to have manufacturing problems;
storing the first simulation-result in a database;
determining a second sample in proximity to a second location in a second layout, wherein the second location is different from the first location, wherein the second sample represents the second layout's geometry within an ambit of the second location, and wherein the second sample's geometry is expected to affect the shape of a second feature;
querying the database to determine if the second sample's geometry is substantially similar to the first sample's geometry; and
in response to determining that that second sample's geometry is substantially similar to the first sample's geometry, using the first simulation-result to generate an indicator which indicates whether the second feature is expected to have manufacturing problems.

9. The computer-readable storage device of claim 8, wherein performing the model-based simulation involves convolving a process model with first sample.

10. The computer-readable storage device of claim 8, wherein prior to determining the first sample, the method comprises:

identifying a polygon's edge which is susceptible to manufacturing problems; and
selecting a location on the polygon's edge to be the first location.

11. The computer-readable storage device of claim 8, wherein storing the first simulation-result involves:
generating a first identifier using the first sample's geometry; and
storing the first identifier and the first simulation-result in the database so that the first simulation-result can be queried using the first identifier.

12. The computer-readable storage device of claim 11, further comprising:
determining a first proximity-correction using the first sample in response to determining that the first feature is expected to have manufacturing problems; and
storing the first proximity-correction in the database so that the first proximity-correction can be queried using the first identifier.

13. The computer-readable storage device of claim 12, further comprising using the database to apply the first proximity-correction to the second sample by:
generating a second identifier using the second sample's geometry;
querying the database using the second identifier to determine whether the first sample's geometry is substantially similar to the second sample's geometry; and
in response to determining that the first sample's geometry is substantially similar to the second sample's geometry, applying the first proximity-correction to the second sample.

14. A computer-readable storage device storing instructions that when executed by a computer cause the computer to perform a method for using a database to quickly perform proximity correction on a layout, the method comprising:
associating via the database a first sample in proximity to a first location in a first layout with a first proximity-correction, and wherein the first sample represents a portion of the first layout which is expected to cause manufacturing problems with a first feature;
determining a second sample in proximity to a second location in a second layout, wherein the second location is different from the first location, wherein the second sample represents the second layout's geometry within an ambit of the second location, wherein the second sample's geometry is expected to affect the shape of a second feature; and
using the database to quickly perform proximity correction on the second sample by:
querying the database using the second sample to determine whether the second sample's geometry is substantially similar to the first sample's geometry; and
in response to determining that the second sample's geometry is substantially similar to the first sample's geometry, applying the first proximity correction to the second sample.

* * * * *